United States Patent
Zhadanovsky

[11] Patent Number: 5,455,015
[45] Date of Patent: Oct. 3, 1995

[54] METHOD FOR THE REMOVAL OF SULFUR AND NITROGEN OXIDES FROM GASES USING SULFATE AND HYDROGEN SULFATE SALT BATHS

[76] Inventor: Igor Zhadanovsky, P.O. Box 301, Newton, Mass. 02159

[21] Appl. No.: 248,605

[22] Filed: May 25, 1994

[51] Int. Cl.$^6$ ............................................. C01B 17/48
[52] U.S. Cl. ................ 423/210.5; 423/244.07; 423/544; 423/545; 423/551; 423/DIG. 12
[58] Field of Search .................. 423/210.5, DIG. 12, 423/244.07, 551, 545, 544; 588/201

[56] References Cited

U.S. PATENT DOCUMENTS

| | | | |
|---|---|---|---|
| 3,552,921 | 1/1971 | Blytas | 423/210.5 |
| 4,244,930 | 1/1981 | Weber | 423/210.5 |
| 4,478,801 | 10/1984 | Tominaga et al. | 423/235 |
| 5,114,690 | 5/1992 | Moore | 423/244 |

FOREIGN PATENT DOCUMENTS

| | | |
|---|---|---|
| 0005270 | 11/1979 | European Pat. Off. . |
| 1084096 | 9/1967 | United Kingdom . |

*Primary Examiner*—Michael Lewis
*Assistant Examiner*—Thomas G. Dunn, Jr.
*Attorney, Agent, or Firm*—Igor Zhadanovsky

[57] ABSTRACT

Sulfur oxides are removed from a gas containing same by contacting the gas with a system including ammonium, potassium, and/or sodium salts in a solid phase and ammonium, sodium, and/or potassium hydrogen sulfate in a liquid phase. The sulfur oxides react with the solid phase to form a hydrogen sulfate in a liquid phase. The hydrogen sulfate is regenerated and returned to the reaction zone as a sulfate. Sulfuric acid may be produced as a byproduct. Ammonia injection into the gas stream which optionally contains nitrogen oxides, converts the nitrogen oxides into nitrogen. The excess ammonia reacts with the sulfur oxides to precipitates in the sulfur oxides reaction zone.

3 Claims, 2 Drawing Sheets

METHOD FOR THE REMOVAL OF SULFUR AND NITROGEN OXIDES FROM GASES USING SULFATE AND HYDROGEN SULFATE SALT BATHS

FIELD OF THE INVENTION

The field of the invention relates to the removal of sulfur and nitrogen oxides from gases produced by fuel combustion, chemical-petrochemical— and metal ores processing.

BACKGROUND OF THE INVENTION

Sulfur is a natural constituent of many raw materials used in industry. Materials such as petroleum, coal, and metal ores contain natural sulfur compounds that may be inorganic or organic. During processing, the sulfur compounds are frequently, oxidized to sulfur dioxide and become part of a waste gas stream. Due to the noxious and poisonous nature of sulfur dioxide, it is necessary to limit the amount of sulfur dioxide that is disposed into the atmosphere as part of a waste gas stream and frequently it is desirable to remove the sulfur dioxide from such gas streams simply for the sake of recovering a valuable material.

In the case of high sulfur oxides content in a gas, catalytic sulfur dioxide conversion into sulfur trioxide is used for sulfuric acid production. The reaction is strongly dependent on temperature with regard to both rate and completeness of the reaction. The rate is basically slow and the catalyst must be used to increase it to commercially acceptable levels.

The most widely used catalyst is vanadium pentoxide. This is incorporated in an essentially inert base material which is formed into uniformly sized pellets or extrusions. Even with this catalyst, the rate of reaction is extremely slow at temperatures below 417° C., which is called the ignition temperature for the catalyst. Once the reaction starts, or is ignited, the heat of reaction raises the gas temperature and the rate of reaction increases rapidly.

There is a limit to the allowable temperature rise because the catalyst can be permanently damaged at temperatures above 627° C. Even below this temperature there is a slow loss of vanadium from the catalyst which eventually requires the replacement of the catalyst operating at the highest temperatures. Complete oxidation of sulfur dioxide to sulfur trioxide can never be achieved under practical conditions because there is always some reaction in the opposite direction. A 98% sulfur dioxide conversion into sulfur trioxide is only possible at the lower operating temperatures around 427° C. At a temperature of 527° C. the conversion is limited to about 90%, and at 627° C. the limit is about 70%.

Removing sulfur dioxide from stack gases is a particularly difficult problem because the stack gases are so large in volume compared to the amount of sulfur dioxide present, the gases are hot, and because the stack gases may contain ingredients that interfere with the sulfur dioxide removal process. Sulfur dioxide is an acid gas, but the usual processes for removing acid gases from a gas stream cannot be employed with stack gases. For example, the most prevalent and successful of such processes is to scrub the gas stream with an organic solvent; however hot stack gases decompose and vaporize organic materials so that the organic solvents cannot be used, or at least cannot be used economically in cleaning stack gases. In order to employ an organic liquid, it is necessary to cool the entire gas stream to a temperature that can be tolerated by the organic liquid, and after sulfur dioxide is removed, it is necessary to re-heat the entire gas stream to restore its buoyancy so it may rise up a stack and carry into the atmosphere. In some cases, blowing is used instead of re-heating, but an essential mount of energy is wasted. Both cooling and heating of a large volume of gas are difficult processes that cannot be justified economically for the removal of the small volume of sulfur dioxide contained in such a gas.

No single method of removing $SO_2$ from large quantities of flue gas has a clear cut advantage over the others. The most used industry methods of $SO_2$ removal from gases are listed below with basic reactions of interest:

a) limestone (and lime) scrubbing processes

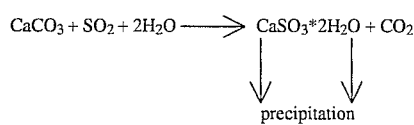

b) limestone scrubbing modified with magnesium sulfate

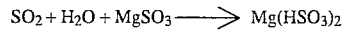

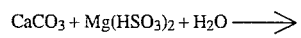

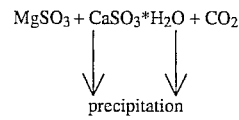

c) magnesium oxide scrubbing $$SO_2+H_2O+MgSO_3 \rightarrow Mg(HSO_3)_2$$

$$Mg(HSO_3)_2 (heat) \rightarrow MgSO_3+SO_2+H_2O$$

d) alkali scrubbing $$Na_2SO_3+SO_2+H_2O \rightarrow 2NaHSO_3$$

$$NaHSO_3+0.5O_2 \rightarrow Na_2SO_4$$

e) citric acid scrubbing f) dry scrubbing

Water solution scrubbing methods from a) to e) produce wet stocks to be purified and throwaway sulfates (either calcium or alkali metals). In order to employ water solutions, it is necessary to cool the entire gas stream to a temperature below the water boiling temperature 100° C.; and after sulfur dioxide is removed, it is necessary to re-heat the entire gas stream to restore its buoyancy so it may rise up a stack and carry into the atmosphere. Dry scrubbing processes don't produce wet stocks and exclude cooling—reheating stages, but they are very difficult to run and said processes produce calcium sulfate. Instead of alkali metals, aqueous ammonium hydroxide can be used in alkali scrubbing.

Ammonia injection is a known way to reduce $NO_x$ emissions according to the following reactions:

$$4NH_3+6NO \rightarrow 5N_2+6H_2O$$

$$8NH_3+6NO_2 \rightarrow 7N_2+12H_2O$$

Temperature control must be maintained in the range of

200°–320° C. Below 200° C. ammonium nitrate is formed. A major problem is ammonium hydrogen sulfate $NH_4HSO_4$ (ammonium bisulfate) formation in presence of the sulfur oxides which leads to deposition on the pipe walls which cause a pressure drop and system clogging.

Chemical reactions imployed in the proposed invention are reactions between sulfate salts, sulfur oxides, and water to form hydrogen sulfates. Similar reactions of sulfite salts with sulfur dioxide and water to form hydrogen sulfites are well known and in practice in Ca and Mg scrubbing processes.

The purpose of the proposed invention is a combination of energetic advantages of molten salts systems (no gas cooling necessary for desulfurization followed by heating to achieve buoyancy) with simple effective chemical reactions. Moreover, the process consumes no inert gas and an ash is the only disposal waste produced, sulfuric acid is produced as a by-product, and simultaneous $SO_x$ and $NO_x$ removal may be achieved.

SUMMARY OF THE INVENTION

The major idea applied in the proposed invention is to utilize the significant difference in the melting points of sulfate and hydrogen sulfate salts. Melting point temperatures in ° C. for some sulfates and bisulfates are shown in Table 1:

TABLE 1

| Me | Sulfate $Me_2SO_4$ | Hydrogen sulfate $MeHSO_4$ |
|---|---|---|
| Ammonium | 280 - decomposition | 146.9 (350-decomposition.) |
| Sodium | 884 (2227-decomposition) | 315 |
| Potassium | 1069 (1070) | 214 |

According to the proposed scheme, gases containing sulfur di- and trioxide gas are contacted with sulfate salts $(Me_2SO_4)$ in a solid phase to form hydrogen sulfate $(MeHSO_4)$ in a liquid phase (where Me is understood to be sodium, potassium, or ammonium). The chemical reactions are shown below:

$$Me_2SO_4 + H_2O + SO_3 \rightarrow MeHSO_4 \quad (1)$$

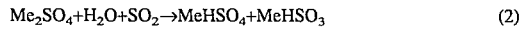

$$Me_2SO_4 + H_2O + SO_2 \rightarrow MeHSO_4 + MeHSO_3 \quad (2)$$

$$MeHSO_3 + 0.5O_2 \rightarrow MeHSO_4 \quad (3)$$

Contact takes place at a temperature high enough to have hydrogen sulfate in a liquid state but below the corresponding sulfate melting temperature and hydrogen sulfate decomposition temperature and at pressure of $P \geq 1$ atm. Higher pressures are a benefit because the chamber size will be reduced, salt decomposition is depressed, and the desired reaction of hydrogen sulfate $MeHSO_4$ formation from the sulfate salt $Me_2SO_4$, gaseous sulfur oxides, and $H_2O$ is promoted.

Liquid hydrogen sulfate $MeHSO_4$ is taken from the contact zone and decomposed either by electrolysis or by heating, and separated to Me, water and sulfur trioxide. Excess sulfur trioxide and water is used to form byproduct sulfuric acid. Me reacts with sulfur trioxide to produce a sulfate $(Me_2SO_4)$ which is returned into the cycle.

DESCRIPTION OF THE PREFERRED EMBODIMENT

Figure 1:
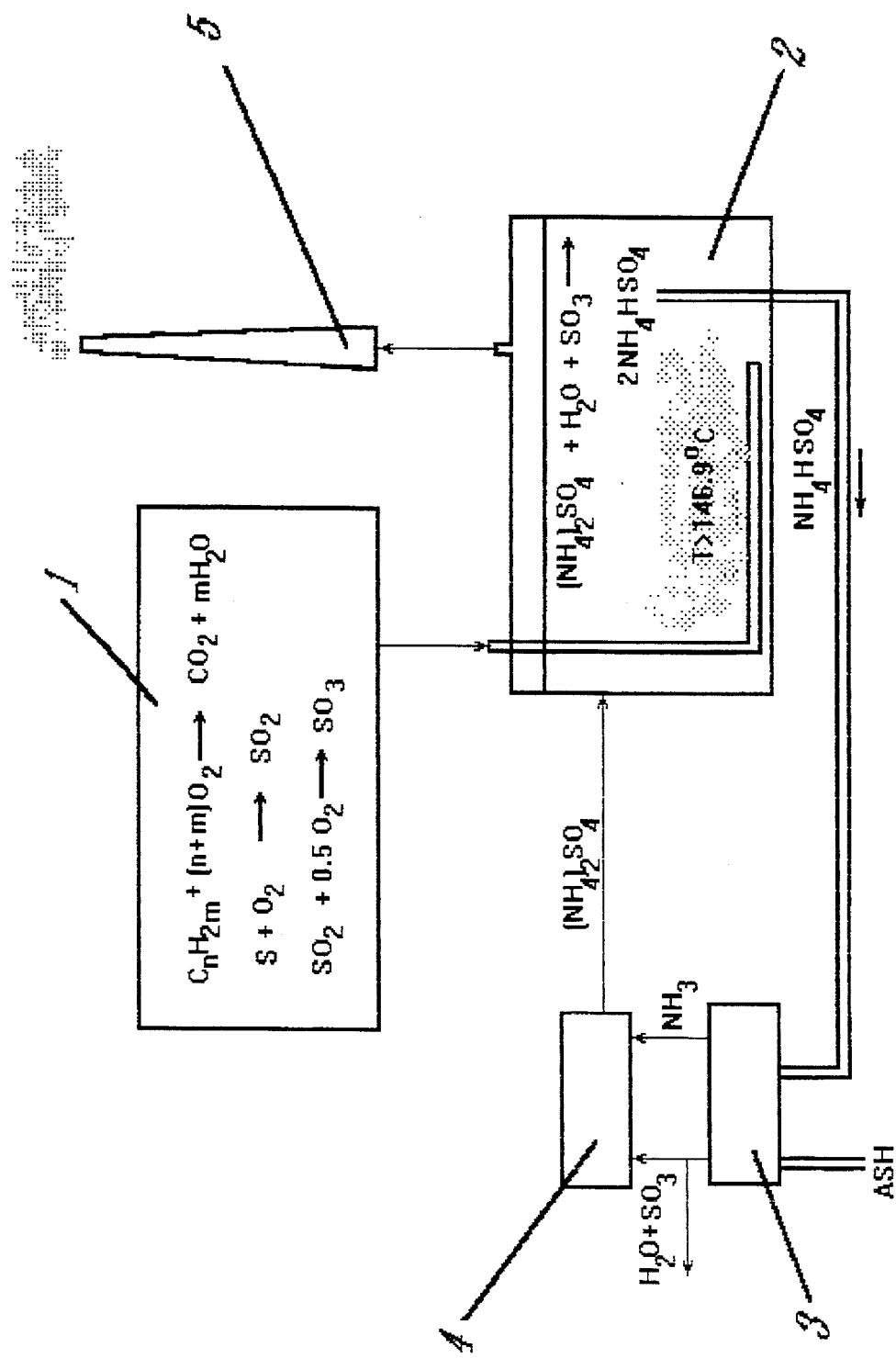
FIG. 1 is a diagram showing a specific embodiment of the present invention.

The process of the invention can be best illustrated with reference to the accompanying drawing—FIG. 1, which shows one process embodying the invention and is intended to be illustrative rather than limiting in scope. The drawing is schematic and does not illustrate pumps, valves, heaters and coolers; however, it is intended that appropriate conventional equipment will be employed where it is obviously required in the process. The drawing also does not intend to illustrate relative sizes even though some vessels are illustrated as being substantially larger than others.

Example 1 (ammonium salts)

According to the proposed invention, a gas containing sulfur di- and trioxide after burner 1, is directed to chamber 2, a contact zone. Contact is accomplished by passing said gas through a molten ammonium hydrogen sulfate and solid ammonium sulfate mixture. Sulfur oxides and water react with ammonium sulfate $(NH_4)_2SO_4$ which is present in a solid phase, to form $NH_4HSO_4$ in a liquid phase. Contact takes place at a temperature high enough to have the $NH_4HSO_4$ in a liquid phase ($\geq 146.9°$ C. for pure $NH_4HSO_4$) but below the decomposition temperature of the $(NH_4)_2SO_4$ (decomposition starts at 280° C. for pure $(NH_4)_2SO_4$). The process is operated at a pressure $P \geq 1$ atm.

From chamber 2, the flue gas goes to stack 5. Liquid $NH_4HSO_4$ is taken to apparatus 3 where it is decomposed, either by electrolysis or by heating to a temperature above 350° C., which is the temperature at which decomposition of $NH_4HSO_4$ begins, to ammoniua, water and sulfur trioxide. In apparatus 4, ammonia reacts with the sulfur trioxide and water to produce $(NH_2)_2SO_4$ which is returned to the contact chamber 2.

Example 2 (combined $SO_x$ and $NO_x$ removal)

In addition to the process steps described in Example 1, ammonia gas is injected in the hot flue gas stream after the burner in order to convert $NO_x$ into $N_2$. Excess ammonia reacts with sulfur oxides to form ammonia hydrogen sulfate $NH_4HSO_4$ which is captured in a chamber 2 as make-up salts without any problems of clogging. This technology provides combined $NO_x$ and $SO_x$ removal.

Example 3 (sodium salts)

The process of Example 1 can also be carried out using sodium salts instead of ammnonium salts. Purified gas reacts with sodium sulfate $Na_2SO_4$ which is present in a solid phase (melting temperature 884° C., decomposition temperature 2227° C.) to form $NaHSO_4$ in a liquid phase (melting temperature 315° C.). The corresponding temperature interval for the sodium salts process is from 315° C. to 884° C.

Example 4 (sodium salts)

Figure 2:
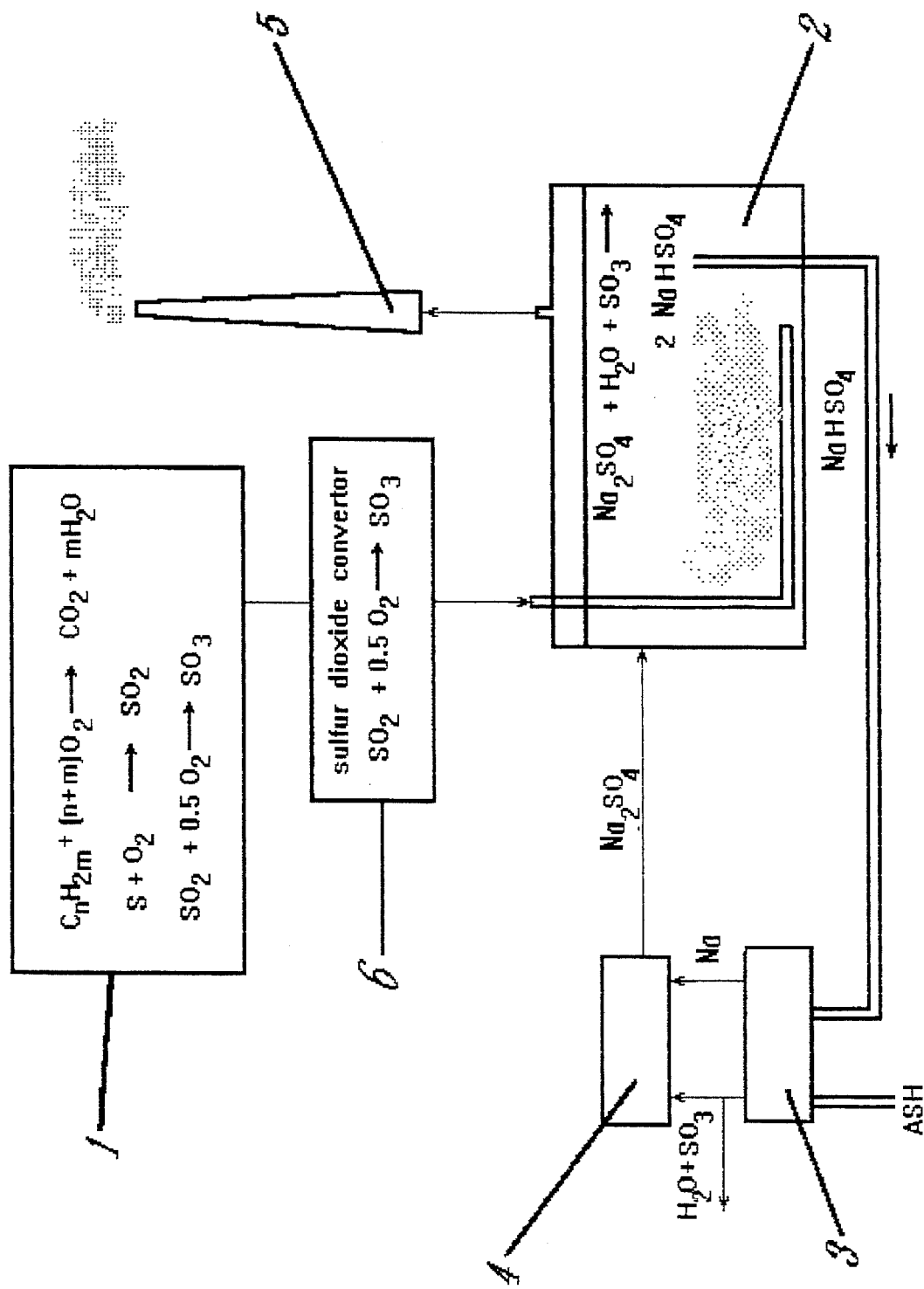
FIG. 2 is a diagram showing a specific embodiment of the present invention having a sulfur dioxide converter therein.

With respect to FIG. 2, the purified gas of Example 3 is contacted with a catalyst in sulfur dioxide converter 6, before chamber 2, to convert sulfur dioxide to sulfur trioxide.

Example 5 (potassium salts)

The process of Example 1 can also be carried out using potassium salts instead of ammonium salts. Purified gas reacts with potassium sulfate $K_2SO_4$ which is present in a solid phase (melting temperature 1069° C.) to form $KHSO_4$ in a liquid phase (melting temperature 197° C.). The corresponding temperature interval for the potassium salts process is from 197° C. to 1069° C.

The use of two or even three component sulfate mixtures is also of interest as a way to vary the melting point of the baths, and as a result, the operating temperature intervals. Therefore the present invention promises some advantages in that combined $NO_x$ and $SO_x$ removal is achieved in the case of ammonium sulfate—hydrogen sulfate baths with an ammonia gas injection as a make—up, the system is a closed cycle for water thereby eliminating wet wastes, and no sludge is thrown away.

What is claimed is:

1. A method for removing sulfur oxides from a gas stream containing sulfur oxides and oxygen which comprises:

contacting said gas stream with a mixture of a solid salt in a molten salt bath consisting essentially of (a) sulfate salts in a solid phase selected from the group consisting of sodium sulfate, potassium sulfate, ammonium sulfate, and mixtures thereof and (b) hydrogen sulfate salts in a molten phase selected from the group consisting of sodium hydrogen sulfate, potassium hydrogen sulfate, ammonium hydrogen sulfate, and mixtures thereof at a temperature between the melting point of the sulfate salts and melting point of the hydrogen sulfate salts present in said bath and at a pressure equal to or greater than atmospheric, reacting the sulfur oxides with the oxygen in said gas stream, water, and the solid sulfate salts in the bath to form liquid hydrogen sulfates, pumping out the liquid hydrogen sulfates from the contact zone and treating said liquid hydrogen sulfates to form solid sulfates, and returning said solid sulfates to be used in the molten salt bath.

2. The process of claim 1, wherein the sulfur oxides and oxygen containing gas stream is contacted with a catalyst to convert any sulfur dioxide present into sulfur trioxide before contacting the gas stream with the molten salt bath.

3. The process of claim 2, wherein the gas stream additionally contains nitrogen oxides; and ammonia gas is injected into the gas stream under conditions effective to convert said nitrogen oxides into nitrogen and water and excess ammonia is reacted with said sulfur oxides to form ammonia hydrogen sulfate which is then captured in the molten salt bed.

* * * * *